US012786050B2

(12) United States Patent
Chen et al.

(10) Patent No.: US 12,786,050 B2
(45) Date of Patent: Nov. 3, 2026

(54) CORRELATION-AWARE EXPLAINABLE ONLINE CHANGE POINT DETECTION

(71) Applicant: NEC Laboratories America, Inc., Princeton, NJ (US)

(72) Inventors: Zhengzhang Chen, Princeton Junction, NJ (US); Haifeng Chen, West Windsor, NJ (US); Haoyu Wang, Plainsboro, NJ (US); Xujiang Zhao, Hillsborough, NJ (US); Chengyuan Deng, Edison, NJ (US)

(73) Assignee: NEC Corporation (JP)

( * ) Notice: Subject to any disclaimer, the term of this patent is extended or adjusted under 35 U.S.C. 154(b) by 134 days.

(21) Appl. No.: 18/800,726

(22) Filed: Aug. 12, 2024

(65) Prior Publication Data

US 2025/0062953 A1 Feb. 20, 2025

Related U.S. Application Data

(60) Provisional application No. 63/533,387, filed on Aug. 18, 2023.

(51) Int. Cl.
*G06F 15/177* (2006.01)
*H04L 41/08* (2022.01)

(52) U.S. Cl.
CPC .................................... *H04L 41/08* (2013.01)

(58) Field of Classification Search
CPC ... H04L 41/08; H04L 41/082; H04L 41/0631; H04L 41/0681; H04L 41/0695; G06F 16/2477
See application file for complete search history.

(56) References Cited

U.S. PATENT DOCUMENTS

| | | | | |
|---|---|---|---|---|
| 2016/0323157 | A1 * | 11/2016 | Marvasti | H04L 43/02 |
| 2022/0027249 | A1 | 1/2022 | Dua et al. | |
| 2023/0069074 | A1 | 3/2023 | Chen et al. | |
| 2023/0376372 | A1 | 11/2023 | Chen et al. | |
| 2024/0054043 | A1 | 2/2024 | Chen et al. | |
| 2024/0061739 | A1 | 2/2024 | Chen et al. | |
| 2024/0061740 | A1 | 2/2024 | Chen et al. | |
| 2024/0129027 | A1 * | 4/2024 | Bode | H04B 7/18517 |
| 2024/0214414 | A1 | 6/2024 | Chen et al. | |

(Continued)

OTHER PUBLICATIONS

Adams, R. P., & Mackay, D. J. (Oct. 19, 2007). Bayesian online changepoint detection. arXiv preprint arXiv:0710.3742.

(Continued)

*Primary Examiner* — Yves Dalencourt
(74) *Attorney, Agent, or Firm* — Vincent Duffy

(57) ABSTRACT

Systems and methods for correlation-aware explainable online change point detection. Collected data metrics from the cloud system can be transformed to correlation matrices. Correlation shifts from the correlation matrices can be captured as differences of correlation between batches of collected data metrics through determined statistics of the batches of collected data metrics across timesteps. Change points in the cloud system can be detected based on the correlation shifts to obtain detected change points. System maintenance can be performed autonomously based on the detected change points from identified system entities to optimize the cloud system with an updated configuration.

13 Claims, 5 Drawing Sheets

(56) References Cited

U.S. PATENT DOCUMENTS

2024/0333615 A1* 10/2024 Ford .................... H04L 43/045

OTHER PUBLICATIONS

Alanqary, A., Alomar, A., & Shah, D. (Dec. 6, 2021). Change point detection via multivariate singular spectrum analysis. Advances in Neural Information Processing Systems, 34, 23218-23230.

Wang, D., Chen, Z., Fu, Y., Liu, Y., & Chen, H. (Aug. 6, 2023). Incremental causal graph learning for online root cause analysis. In Proceedings of the 29th ACM SIGKDD Conference on Knowledge Discovery and Data Mining (pp. 2269-2278).

Wang, D., Chen, Z., Ni, J., Tong, L., Wang, Z., Fu, Y., & Chen, H. (Aug. 6, 2023). Interdependent causal networks for root cause localization. In Proceedings of the 29th ACM SIGKDD Conference on Knowledge Discovery and Data Mining (pp. 5051-5060).

Zheng, L., Chen, Z., Wang, D., Deng, C., Matsuoka, R., & Chen, H. (2024, June 8). Lemma-Rca: A Large Multi-modal Multi-domain Dataset for Root Cause Analysis. arXiv preprint arXiv:2406.05375.

Zheng, L., Chen, Z., He, J., & Chen, H. (May 13, 2024). MULAN: Multi-modal Causal Structure Learning and Root Cause Analysis for Microservice Systems. In Proceedings of the ACM on Web Conference 2024 (pp. 4107-4116).

Wang, X., Borsoi, R. A., & Richard, C. (Sep. 4, 2023). Online change point detection on riemannian manifolds with Karcher mean estimates. In 2023 31st European Signal Processing Conference (EUSIPCO) (pp. 2033-2037). IEEE.

Deng, C., Chen, Z., Zhao, X., Wang, H., Wang, J., Chen, H., & Gao, J. (Jul. 12, 2024). RIO-CPD: A Riemannian Geometric Method for Correlation-aware Online Change Point Detection. arXiv preprint arXiv:2407.09698.

Jedelyn Cabrieto et al., 'Capturing correlation changes by applying kernel change point detection on the running correlations', Information Sciences vol. 447, Jun. 2018 (sections 2.4, 5).

* cited by examiner

CORRELATION-AWARE EXPLAINABLE ONLINE CHANGE POINT DETECTION

RELATED APPLICATION INFORMATION

This application claims priority to U.S. Provisional App. No. 63/533,387, filed on Aug. 18, 2023, incorporated herein by reference in its entirety.

BACKGROUND

Technical Field

The present invention relates to artificial intelligence for information technology operations (AIOPs) for distributed computing environments, and more particularly to correlation-aware explainable online change point detection.

Description of the Related Art

Current cloud systems interconnect numerous computing nodes to provide robust, scalable, online workflow processes. Because of the large number of computing nodes and processes generated, current cloud systems produce enormous amounts of data. Such data could be used to determine the status of a cloud system. However, finding a vulnerability within the cloud system using such data would be a difficult task. Additionally, due to the immense scale of cloud systems, a significant amount of time and resources would be allotted to identify, solve, and prevent such issues.

SUMMARY

According to an aspect of the present invention, a computer-implemented method is provided for correlation-aware explainable online change point detection, including, transforming collected data metrics from the cloud system to correlation matrices, capturing correlation shifts from the correlation matrices as differences of correlation between batches of collected data metrics through determined statistics of the batches of collected data metrics across timesteps, detecting change points in the cloud system based on the correlation shifts to obtain detected change points, and performing system maintenance autonomously based on the detected change points from identified system entities to optimize the cloud system with an updated configuration.

According to another aspect of the present invention, a system is provided for correlation-aware explainable online change point detection, including a memory device, one or more processor devices operatively coupled with the memory device to transform collected data metrics from the cloud system to correlation matrices, capture correlation shifts from the correlation matrices as differences of correlation between batches of collected data metrics through determined statistics of the batches of collected data metrics across timesteps, detect change points in the cloud system based on the correlation shifts to obtain detected change points, and perform system maintenance autonomously based on the detected change points from identified system entities to optimize the cloud system with an updated configuration.

According to another aspect of the present invention, a non-transitory computer program product including a computer-readable storage medium including program code for correlation-aware explainable online change point detection is provided, wherein the program code when executed on a computer causes the computer to transform collected data metrics from the cloud system to correlation matrices, capture correlation shifts from the correlation matrices as differences of correlation between batches of collected data metrics through determined statistics of the batches of collected data metrics across timesteps, detect change points in the cloud system based on the correlation shifts to obtain detected change points, and perform system maintenance autonomously based on the detected change points from identified system entities to optimize the cloud system with an updated configuration through root cause analysis and generate explanations of the change points obtained from the status of the cloud system to assist the decision making of a cloud system professional.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Figure 1:
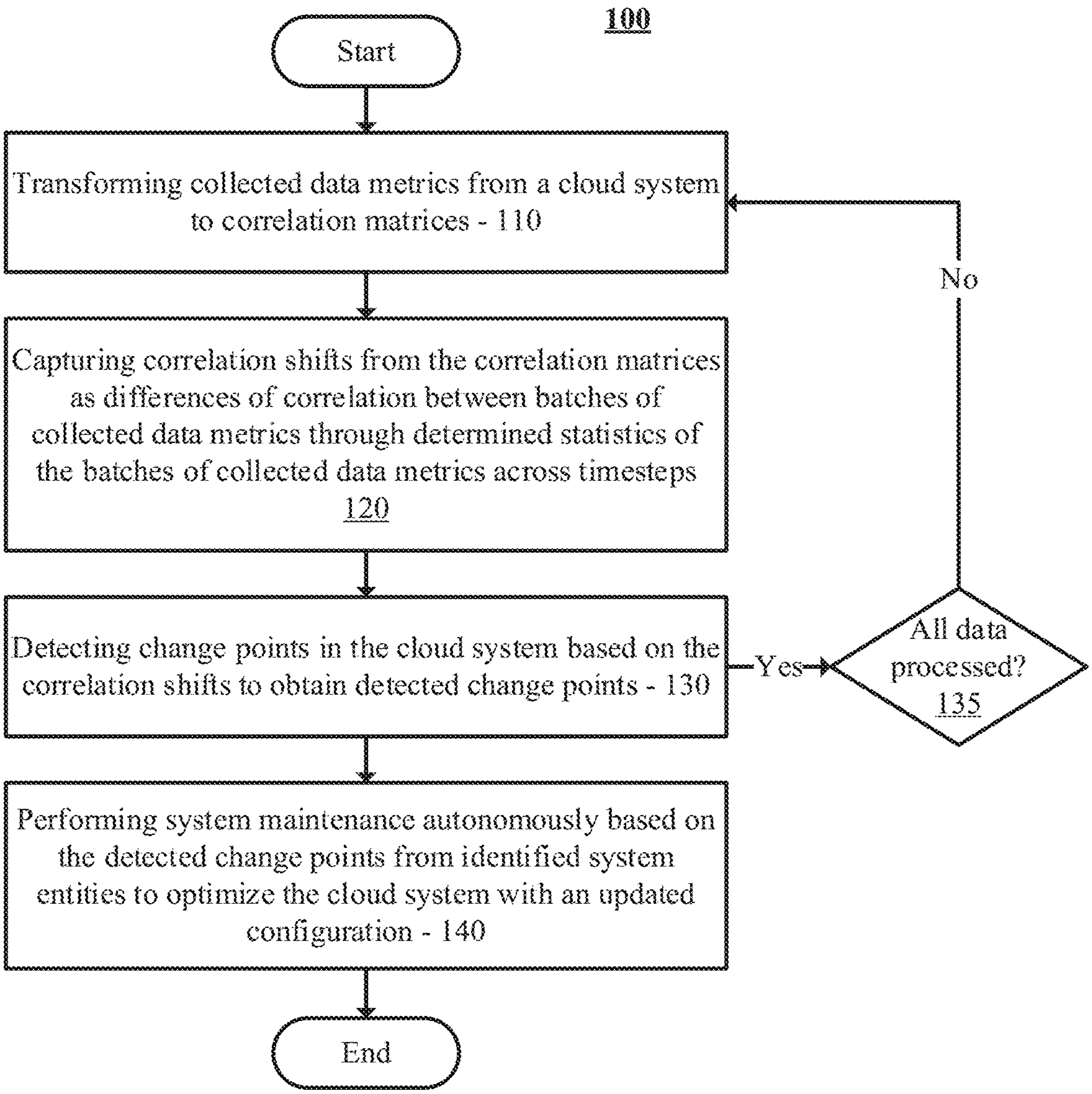
FIG. 1 is a flow diagram illustrating a high-level overview of a method for correlation-aware explainable online change point detection, in accordance with an embodiment of the present invention.

In accordance with embodiments of the present invention, systems and methods are provided for correlation-aware explainable online change point detection.

Change point detection (CPD) aims to detect change points which are abrupt changes of collected data metrics over time-series data such as a significant increase in memory utilization, disk utilization, processor load, latency, etc. The identification of change points can be used for understanding dynamic processes performed in a cloud system, detecting data anomalies from the cloud system, forecasting future trends for system entities (e.g., containers, nodes, processes) of the cloud system, and facilitating timely interventions to avoid system failure caused by the change points.

In an embodiment, a cloud system can be improved by autonomously performing system maintenance based on system issues or vulnerabilities that can be caused by detected change points of a CPD module. The cloud system can be optimized based on a system maintenance plan tailored to resolve the system issues or vulnerabilities that can be caused by the detected change points. The system maintenance plan can include updating system entity hardware configuration, removing extraneous software processes, recommending upgraded service level agreements, upgrading virtualization software configuration, etc. The performance, reliability, and speed of the cloud system can be improved with autonomous system maintenance which saves time and lowers costs.

The cloud system can be improved by employing an intelligent system manager that can perform CPD faster and more effectively. The present embodiments can perform CPD in seconds which is faster than other methods. The present embodiments can perform CPD more effectively as the present embodiments avoid false negative and false positive outputs.

Change points can be detected from the correlation shifts through determined statistics of correlation shifts across timesteps. Correlation shifts can be captured from correlation matrices as differences of correlation between batches of data. Correlation matrices can be transformed from collected data metrics of the cloud system to capture the changes in correlation between the collected data metrics of the cloud system.

In another embodiment, the intelligent system manager can perform root cause analysis based on the detected change points to improve the system maintenance of the cloud system. In another embodiment, the intelligent system manager can perform failure fault detection to generate explanations of the change points of the status of the cloud system which improves the system maintenance of the cloud system.

Referring now to the current challenges of multivariate change point detection that the present embodiments attempt to solve.

Capturing correlation shifts from multiple domains. Change points may appear due to different sources, for example, mean of the distribution, correlation between features, etc. However, most current methods focus on detecting distribution shift, while ignoring correlation shifts. Numerous domains can have change points due to correlation shifts, including environmental monitoring, sensor networks, and internet of things (IoT) devices.

Prompt report delivery in online data streaming networks. Another challenge of change point detection is dealing with an online network that constantly streams data. In most scenarios, a change point may lead to anomalies, system failures or other status that can prompt further decisions to be made. Multivariate time-series data can cover important features that compose the dynamics in the system which can be reported by a monitoring system in its entirety through data streams. Due to the streaming nature of the network, the report regarding change points should be delivered as soon as a change point has been detected in a data stream for a particular point in time, without revealing any future data.

Explanations of change points. In addition to the detection of potential change points, the knowledge of the underlying reasons that contribute to the change can assist prompt debugging and fixing. Therefore, pursuing explanations in change points can be an aspect of a change point detection method or system.

Ensuring performance quality of cloud systems is an important aspect of distributed computing environment platforms because system failures or system faults caused by change points can degrade user experience and cause financial loss. A CPD module as described herein can take the streaming data of cloud systems, which is multivariate time-series data, and can perform autonomous system maintenance based on detected change points which can help a cloud system professional locate potential system issues. The CPD module can be integrated to work seamlessly with cloud systems, with flexible extensions with new features and the ability to be applied to similar Artificial Intelligence Information Technology Operations (AIOps) systems.

The present embodiments address the challenges described herein by performing CPD effectively in seconds which can significantly reduce the potential loss of data and resources (e.g., time, money, computing resources) due to the system failure caused by detected change points.

Referring now in detail to the figures in which like numerals represent the same or similar elements and initially to FIG. 1, a high-level overview of the computer-implemented method for correlation-aware explainable online change point detection is illustratively depicted in accordance with one embodiment of the present invention.

In an embodiment, a cloud system can be improved by autonomously performing system maintenance based on system issues or vulnerabilities that can be caused by detected change points. The cloud system can be optimized based on a system maintenance plan tailored to resolve the system issues or vulnerabilities that can be caused by the detected change points. The system maintenance plan can include updating system entity hardware configuration, removing extraneous software processes, recommending upgraded service level agreements, blocking packets from a certain internet protocol (IP) address, etc.

Additionally, the cloud system can be improved by employing an intelligent system manager that can perform improved change point detection faster and more effective. To detect change points, correlations between features and streaming data can be captured. To capture the correlation between features and streaming data, streaming data and features can be collected in batches and can be transformed into the correlation matrices. To understand the correlation matrices, a corresponding manifold metric can be employed to calculate the correlation shift between batches of data. To detect the change points, hypothesis testing methods can be applied on the correlation shift distances. To locate the features as explanations, the corresponding correlation matrices can be tracked and the contributions of each pair of features can be extracted.

The steps of an embodiment of the present invention which can include a computer implemented method for correlation-aware explainable online change point detection 100 that can be further explained by blocks 110-140 which are described herein.

In block 110, collected data metrics from the cloud system can be transformed to correlation matrices to capture the correlation between the collected data metrics of the cloud system.

In an embodiment, the CPD module 350 (shown in FIG. 3) can collect data metrics from the cloud system. The collected data metrics 310 (shown in FIG. 3) can be time series data that can be streamed directly from the cloud system. There can be two types of collected data metrics 310: key performance indicator (KPI) data 312 (shown in FIG. 3) for the physical network 303 (shown in FIG. 3) of the cloud system, and network metrics data 316 (shown in FIG. 3) for system entities of the cloud system, which can include running containers and computing nodes including applications of the virtualization layer 305 (shown in FIG. 3). The collected data metrics can be sent from the cloud system 301 to a backend server 326 (shown in FIG. 3) for storage through a network. The collected data metrics 310 can be sent from the cloud system 301 to an analytics server 329 (shown in FIG. 3), that can include the CPD module, through a network.

KPI data 312 can include system performance information (e.g. features) of a system entity of the cloud system such as elapsed time, latency, connect time, thread name, throughput etc. The load testing tool can be JMeter®, Locust®, etc. Other load testing tools are contemplated. The KPI data 312 can be formatted in a chronological order having the data related to time to be included in the beginning. For example, the format can be "timestamp, elapsed, idle time, connect time, etc."

The latency data 314 (shown in FIG. 3) and connect time data 313 (shown in FIG. 3) can be the primary performance KPIs of the whole cloud system. The latency data 314 measures the latency from just before sending the request from a system entity, to just after a first chunk of the response has been received by another system entity. Connect time data 313 measures the time it took to establish the connection between at least two system entities, including a secure sockets layer (SSL) handshake.

Both latency data 314 and connect time data 313 are time series data, which can indicate the system status and directly reflect the quality of service of system entities. For example, the quality of service of system entities can show whether the whole system has some failure events happening or not, because system failure can result in the latency data 314 or connect time data 313 significantly increasing.

The cloud management system 322 (shown in FIG. 3) can collect network metrics data 316. The cloud management system 322 can be Openshift®, Prometheus™, etc. Other cloud management systems are contemplated. The network metrics data 316 can include a number of metrics which indicate the status of a system entity of the cloud system. The network metrics data 316 (e.g. features) can be the central processing unit (CPU) utilization or saturation data 318 (shown in FIG. 3), memory utilization or saturation 317 (shown in FIG. 3), or disk input/output (I/O) utilization.

Referring now to correlation matrices, in accordance with an embodiment of the present invention.

Correlation matrices can be square matrices that can show the correlation between each pair of elements of a random vector that can include observations of collected data metrics 310. In an embodiment, to compute the correlation matrix, input batch data of collected data metrics 310 can be collected to obtain a time span of B steps and converted to its matrix form X where $X \in \mathbb{R}^{M \times B}$, where M denotes the number of features, $\mathbb{R}$ is a set of real numbers. The correlation matrix can be obtained by calculating $C = X^T X$, where $X^T$ is the transpose of matrix X.

The present embodiments can improve the cloud system through CPD by transforming collected data metrics 310 into correlation matrices. The correlation matrices can be compared with each other to capture correlation shifts from at least one domain such as collected data metrics 310 from the cloud system.

In block 120, correlation shifts can be captured from the correlation matrices as differences of correlation between batches of collected data metrics 310 through determined statistics of the batches of collected data metrics 310 across timesteps.

In an embodiment, the difference of correlation (e.g., correlation shifts from the correlation matrices) between batches of data can be captured as the distance between two points on a certain Riemannian manifold. Correlation matrices are positive semi-definite (PSD) matrices, which have matrix spaces that lie on a certain Riemannian manifold.

To capture the correlation shifts, two Riemannian manifold metrics can be employed: log-Euclidean distance or log-Cholesky distance. The distance between two correlation matrices $C_1$, $C_2$ can be captured with the manifold metric.

In an embodiment, log-Euclidean can be employed to capture the correlation shifts. For log-Euclidean distance: distance $(C_1, C_2) = \log(\text{euclidean}(C_1, C_2)) = \|\log(C_1) - \log(C_2)\|$. The log-Euclidean distance is between two batches of collected data metrics 310, with $d_i$, where i is the number of batches of collected data, from times $t_i$, $t_{i+1}$, which captures the correlation shift. In another embodiment, the geodesic distance (g) between the Fréchet mean (F) of the correlation matrices prior to time t (e.g., $C_1, C_2, \ldots C_{t-1}$) using a log-Euclidean metric (le) and a correlation matrix for time (Ct) can be computed as $$d_i = g\left(C_t, F_{t-1}^{le}\right).$$

In another embodiment, log-Cholesky can be employed to capture the correlation shifts. For the log-Cholesky distance, the log-Cholesky metric is developed for Riemannian manifold based on Cholesky decomposition of semi positive-definite (SPD) matrices. The major advantage of this metric is the efficient computation while fully circumvention of the notorious swelling effect. It can further employ the Lie-group structure as the metrics previously proposed, such as log-Euclidean metric. The geodesic distance (g) between the Fréchet mean (F) of the correlation matrices prior to time t (e.g., C1, C2, . . . . Ct−1) using a log-Cholesky (lc) metric and a correlation matrix for time (Ct) can be computed as $$d_i = g\left(C_t, F_{t-1}^{lc}\right).$$

The present embodiments can improve the cloud system through CPD by capturing correlation shifts which can be ignored by other methods. The correlation shifts can be tested with cumulative sum (CUSUM) statistics to detect change points.

In block 130, change points in the cloud system can be detected based on the correlation shifts to obtain detected change points.

In an embodiment, change points can be detected based on the correlation shifts. To detect the change points, hypothesis testing methods can be applied on the correlation shift distances. The CUSUM statistics are a sequence along time that capture the maximum of a current value summed with the previous timestep. The CUSUM hypothesis test asserts a change point at time t if the CUSUM statistics is larger than a threshold which can be inferred from the data. Otherwise, the test is passed.

Given an observation X(t) a detection score (D(t)) can be assigned to define the CUSUM statistics of observations X(1) . . . X(t) within a sliding window with size W, $r_{t-1}$ as the maximum geodesic distance for the past observations before t, and $F_{t-1}$ is the Fréchet mean using log-Euclidean or log-Cholesky as $$D(t) = d_t - r_{t-1} = g(C_t, F_{t-1}) - \max_{i \in [t-1]} g(C_i, F_{t-1})$$

Using the CUSUM statistics, a threshold h>0 can be estimated, the decision rule is an indicator function that the statistics is larger than the threshold which determines whether there is a change point (CP) or not:

$$CP = \inf_{t>W} \{t|D(t) > h\}.$$

The threshold can be a small constant ranging from zero to five. The threshold can be dependent on the input data range. To select the threshold, different heuristics can be used such as a mean plus three times standard deviation.

In another embodiment, y(W)=0 to be the start of the sequence, then D(t)=max{y(t−1)+distance (t)}.

The detection score D(t) can have a negative expectation when no change is present, and a positive expectation when a change occurs.

In an embodiment, the process including steps 110, 120, and 130, can be repeated after a change point (CP) is detected with new base correlation matrix $C_{cp+1}$ until all batch data has been processed as shown in step 135.

The present embodiments can improve the cloud system through CPD by employing incremental CPD through CUSUM statistics which can perform CPD faster and more effectively than other methods. Additionally, the present embodiments can improve the cloud system through CPD by employing the detected change points from identified system entities to autonomously perform system maintenance to optimize the cloud system with an updated configuration.

In block 140, the cloud system can autonomously perform system maintenance based on the detected change points from identified system entities to optimize the cloud system with an updated configuration.

The present embodiments can improve the cloud system by autonomously performing system maintenance based on a system maintenance plan that can be tailored to the detected change point to optimize the cloud system with an updated configuration. For example, if the detected change point is related to CPU utilization, the system maintenance plan can include updating the cloud system with more CPU resources, updating the virtualization layer of the cloud system, etc.

In an embodiment, an intelligent system manager 340 (shown in FIG. 3) can process the detected change points and create a system maintenance plan 504 (shown in FIG. 5) for the cloud system 301 to resolve a system issue caused by the detected change points. The system maintenance plan 504 can include applying system patches to the cloud system 301 to overcome a system vulnerability that can be caused by the detected change points. The system monitoring agent 325 can then autonomously place the cloud system 301 under system maintenance to install the system patches. The installation of the system patches can be done in the background without interfering with access to the cloud system 301.

In another embodiment, the system maintenance plan 504 can include updating the system configuration of the physical network 303 of the cloud system 301 such as increasing CPU or memory capacity. In another embodiment, the system maintenance plan 504 can include updating the configuration of the virtualization layer 305 of the cloud system 301 such as updating container and node configuration.

In another embodiment, the intelligent system manager 340 can perform root cause analysis based on the detected change points. The intelligent system manager 340 can then notify a cloud system professional 501 through an alarm module regarding the results of the root cause analysis based on the detected change points. To perform root cause analysis, the detected change points can undergo incremental causal discovery and root cause localization.

To perform root cause localization, the detected change points can be processed and identified from batches of collected data metrics 310 at a given time. The collected data metrics 310 can include identification features of the system entities that were flagged to have detected change points (e.g., which computing node in the physical network and what workload process within the cloud system, etc.) to pinpoint the root cause of the system failure, system vulnerability, system issue, etc. A random walk-based method can be used to capture the patterns of the malfunctioning effects that can be caused by the detected change points from a causal graph that can be generated from the correlation matrices. The causal graph can be generated from the correlation matrices by performing incremental causal discovery.

To perform incremental causal discovery, as described herein, the process of detecting change points can occur in an incremental manner by detecting the correlation between observations and past observations by transforming the collected data metrics 310 into correlation matrices. As described herein, each observation and change points throughout time in a sliding window has an identifiable source (e.g., workload process, physical node, task, etc.) that can be detected through CUSUM statistical testing. A causal graph learning model with an encoder-decoder framework can generate the causal graph from the correlation matrices. A long short-term memory network (LSTM) and a variational graph autoencoder (VGAE) can be used as an encoder. A structural vector autoregressive model (SVAR) can be used as a decoder.

Change points are transitions in system status that signal significant shifts. In root cause analysis, these change points can be viewed as triggers or starting points for the investigation process. When a change point is detected, it can indicate a system fault or failure which can prompt automatic initiation of root cause analysis that can identify the root cause sooner and mitigate potential system damage or losses.

In another embodiment, the intelligent system manager 340 can output explanations regarding system faults or failure based on the detected change points. The detected change points can have identifiable sources and timestamps on which point and batch of processing the change point and detected change point occurred (e.g., batch processing data). The source identifier, timestamp, batch processing data can be compiled and converted to a complete sentence to produce an explanation of how a system fault or failure occurred due to the detected change point. In another embodiment, the conversion to complete sentences can be done by an artificial intelligence model 349.

Once change points are detected, methods for root cause analysis models or conventional causal graphs may not be directly applicable as they merely capture causal relations from previously collected data. However, system state data can include causal dependencies that can vary with currently collected streaming data (e.g., state-dependent causation), which other methods fail to identify. The present embodiments can identify system state change points that include state-dependent causation with minimal delay.

In another embodiment, the intelligent system manager 340 can perform log analysis and process the logs produced in the cloud system and detect change points within the cloud through the logs.

In another embodiment, the intelligent system manager 340 can perform risk analysis by analyzing the detected change points to identify the potential issues and consequences associated with the detected change points. The identified potential issues can be assessed to evaluate their severity and likelihood of occurrence. The identified potential issues can be ranked based on severity and likelihood of occurrence which can be presented to the cloud system professional to help with their decision making.

The present embodiments provide a correlation-aware explainable online change point detection methods and systems for AIOps in a cloud system that can overcome the difficulty of handling big data for the cloud system in determining potential cloud system vulnerabilities and issues as soon as the change points have been detected and processed, thus, improving the cloud system. By transforming collected data metrics 310 into correlation matrices, the present embodiments can be aware of the correlations between the collected data metrics 310 of an online cloud system. By capturing correlation shifts from the correlation matrices, the present embodiments can incrementally determine change points through determined statistics of batches of collected data metrics 310 across timesteps. Change points can then be detected in the cloud system based on the correlation shifts which can generate explanations of how the change points occurred. The cloud system can be improved by performing system maintenance autonomously based on the detected change points from identified system entities to optimize the cloud system with an updated configuration.

Additionally, the present embodiments improve the cloud system through an improved CPD that can detect change points faster and more effectively than other methods.

Figure 2:
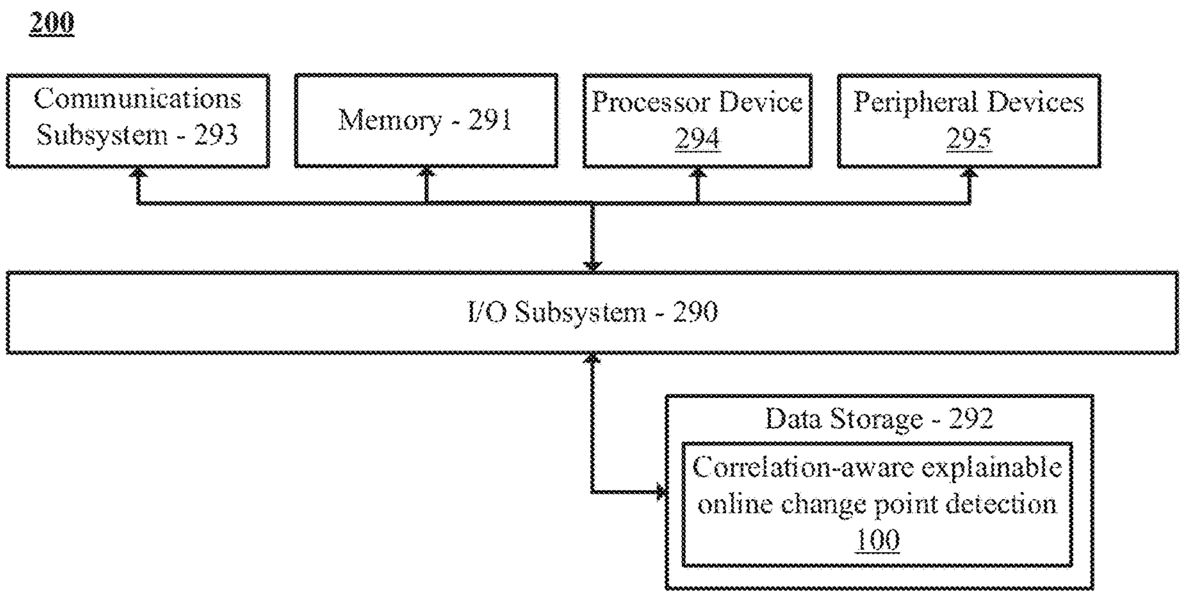
FIG. 2 is a block diagram illustrating a system for correlation-aware explainable online change point detection, in accordance with an embodiment of the present invention.

Referring now to FIG. 2, a block diagram showing a computing system for correlation-aware explainable online change point detection 200, in accordance with an embodiment of the present invention.

The computing device 200 illustratively includes the processor device 294, an input/output (I/O) subsystem 290, a memory 291, a data storage device 292, and a communication subsystem 293, and/or other components and devices commonly found in a server or similar computing device. The computing device 200 may include other or additional components, such as those commonly found in a server computer (e.g., various input/output devices), in other embodiments. Additionally, in some embodiments, one or more of the illustrative components may be incorporated in, or otherwise form a portion of, another component. For example, the memory 291, or portions thereof, may be incorporated in the processor device 294 in some embodiments.

The processor device 294 may be embodied as any type of processor capable of performing the functions described herein. The processor device 294 may be embodied as a single processor, multiple processors, a Central Processing Unit(s) (CPU(s)), a Graphics Processing Unit(s) (GPU(s)), a single or multi-core processor(s), a digital signal processor (s), a microcontroller(s), or other processor(s) or processing/controlling circuit(s).

The memory 291 may be embodied as any type of volatile or non-volatile memory or data storage capable of performing the functions described herein. In operation, the memory 291 may store various data and software employed during operation of the computing device 200, such as operating systems, applications, programs, libraries, and drivers. The memory 291 is communicatively coupled to the processor device 294 via the I/O subsystem 290, which may be embodied as circuitry and/or components to facilitate input/output operations with the processor device 294, the memory 291, and other components of the computing device 200. For example, the I/O subsystem 290 may be embodied as, or otherwise include, memory controller hubs, input/output control hubs, platform controller hubs, integrated control circuitry, firmware devices, communication links (e.g., point-to-point links, bus links, wires, cables, light guides, printed circuit board traces, etc.), and/or other components and subsystems to facilitate the input/output operations. In some embodiments, the I/O subsystem 290 may form a portion of a system-on-a-chip (SOC) and be incorporated, along with the processor device 294, the memory 291, and other components of the computing device 200, on a single integrated circuit chip.

The data storage device 292 may be embodied as any type of device or devices configured for short-term or long-term storage of data such as, for example, memory devices and circuits, memory cards, hard disk drives, solid state drives, or other data storage devices. The data storage device 292 can store program code for correlation-aware explainable online change point detection 100. Any or all of these program code blocks may be included in a given computing system.

The communication subsystem 293 of the computing device 200 may be embodied as any network interface controller or other communication circuit, device, or collection thereof, capable of enabling communications between the computing device 200 and other remote devices over a network. The communication subsystem 293 may be configured to employ any one or more communication technology (e.g., wired or wireless communications) and associated protocols (e.g., Ethernet, InfiniBand®, Bluetooth®, Wi-Fi®, WiMAX, etc.) to effect such communication.

As shown, the computing device 200 may also include one or more peripheral devices 295. The peripheral devices 295 may include any number of additional input/output devices, interface devices, and/or other peripheral devices. For example, in some embodiments, the peripheral devices 295 may include a display, touch screen, graphics circuitry, keyboard, mouse, speaker system, microphone, network interface, and/or other input/output devices, interface devices, GPS, camera, and/or other peripheral devices.

Of course, the computing device 200 may also include other elements (not shown), as readily contemplated by one of skill in the art, as well as omit certain elements. For example, various other sensors, input devices, and/or output devices can be included in computing device 200, depending upon the particular implementation of the same, as readily understood by one of ordinary skill in the art. For example, various types of wireless and/or wired input and/or output devices can be employed. Moreover, additional processors, controllers, memories, and so forth, in various configurations can also be utilized. These and other variations of the computing system 200 are readily contemplated by one of ordinary skill in the art given the teachings of the present invention provided herein.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

The cloud system can have at least the following service models: software as a service (SaaS), platform as a service (PaaS), or Infrastructure as a service (IaaS). Other service models are contemplated. The cloud system can have at least the following deployment models: private cloud, community cloud, public cloud or hybrid cloud. Other deployment models are contemplated.

Figure 3:
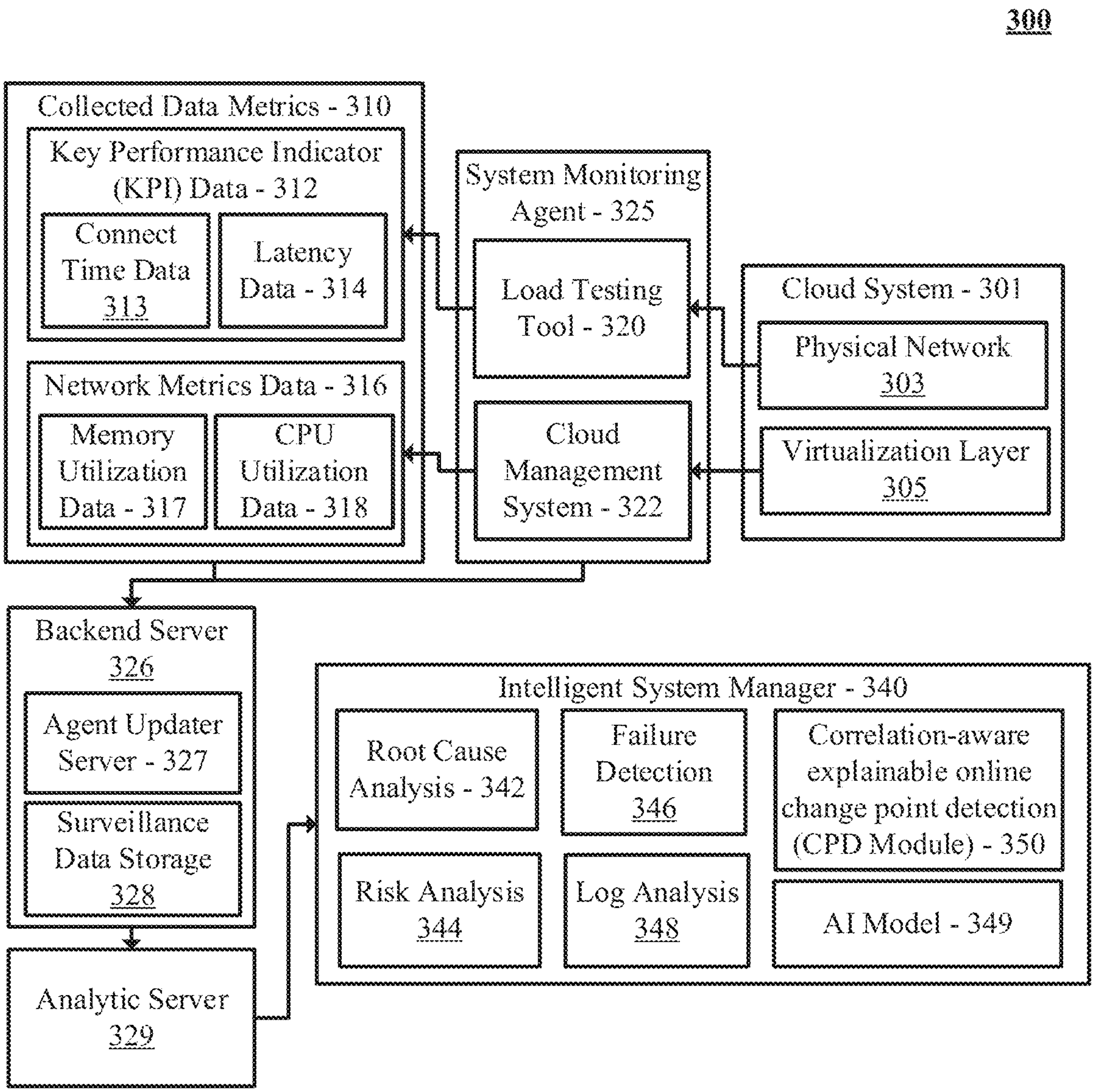
FIG. 3 is a block diagram illustrating a cloud intelligent system architecture for correlation-aware explainable online change point detection, in accordance with an embodiment of the present invention.

Referring now to FIG. 3, a block diagram showing a cloud intelligent system architecture for correlation-aware explainable online change point detection, in accordance with an embodiment of the present invention.

The cloud intelligent system architecture 300 can have several components, layers, and functions including a physical network, a virtualization layer, a management layer and a workloads layer.

The physical network 303 can include hardware and software components. Examples of hardware components include: mainframes, RISC (Reduced Instruction Set Computer) architecture-based servers, servers, blade servers, storage devices, and networks and networking components. In some embodiments, software components include network application server software and database software.

The virtualization layer 305 provides an abstraction layer from which the following examples of virtual entities may be provided: virtual servers, virtual storage, virtual networks, including virtual private networks, virtual applications, operating systems, and virtual clients.

In an example, a management layer may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provides pre-arrangement for, and procurement of, cloud computing resources for which a future requirement is anticipated in accordance with an SLA.

Workloads layer provides examples of functionality for which the cloud computing environment may be utilized. Examples of workloads and functions which may be provided from this layer include software development and lifecycle management, data analytics processing, and transaction processing.

In an embodiment, the data analytics processing in the workloads layer can include the system monitoring agent 325, backend server 326, analytics server 329 and the intelligent system manager 340.

In an embodiment, the cloud system 301, backend server 326, and analytics server 329 can be positioned in geographically different locations and interconnected by networks. In another embodiment, the cloud system 301, backend server 326, and analytics server 329 can be positioned in the same geographical location and interconnected by networks.

The backend server 326 and analytics server 326 can include hardware and software components. Examples of hardware components include: mainframes, RISC architecture-based servers, servers, blade servers, storage devices, and networks and networking components. In some embodiments, software components include network application server software and database software.

In an embodiment, the intelligent system manager 340 can include root cause analysis module 342, a risk analysis module 344, a failure detection module 346, and a log analysis module 348. The intelligent system manager 340 can include correlation-aware explainable online change point detection (e.g., CPD Module) 350.

The root cause analysis module 342 can perform the root cause analysis for the cloud system described herein. The risk analysis module 344 can perform the risk analysis for the cloud system described herein. The failure detection module 346 can perform the failure detection for the cloud system described herein. The log analysis module 348 can perform the log analysis for the cloud system described herein.

The intelligent system manager 340 can include an AI model 349 to learn the detected change points and predict the system vulnerabilities or issues that may be caused by the detected change points. The intelligent system manager 340 can employ the AI model 349 to also predict appropriate fixes to the predicted system vulnerabilities and issues that may be caused by the detected change points. Due to the streaming nature of cloud systems, the AI model 349 can be continuously trained with newly collected data metrics 310 from the cloud system to fine-tune the predictions of the AI model 349. The AI model 349 can be autoencoders, gaussian mixture models, graph neural networks, Bayesian networks, etc. Other artificial intelligence frameworks are contemplated.

The intelligent system manager 340 can be included in an analytic server 329.

The Analytic Server 329

The backend server 326 can include an agent updater server 327 and the surveillance data storage 328. The agent updater server 327 can ensure that the system monitoring agent 325 is updated with the latest version of firmware and software updates that are compatible with the current cloud system 301 infrastructure. The backend server 329 can perform data pre-processing of the collected data metrics 310 that has been stored in surveillance data storage 328 within the backend server 326. The data pre-processing process can ensure that the collected data metrics 310 is clean, consistent, and relevant. As such, the data pre-processing process can include data formatting, data quality assurance, data normalization, data integration, data cleaning, etc.

The system monitoring agent 325 can monitor the cloud system 301 by installing a load testing tool 320 and a cloud management system 322. The load testing tool 320 can collect the KPI Data 312 that can include connect time data 313 and latency data 314. The cloud management system 322 can collect network metrics data 316 that can include a number of metrics which indicates the status of system entities (e.g., computing nodes, containers) of the cloud system such as memory utilization data 317 and CPU utilization data 318.

A cloud computing environment is service oriented with a focus on statelessness, low coupling, modularity, and semantic interoperability. At the heart of cloud computing is an infrastructure that includes a network of interconnected nodes.

Figure 4:
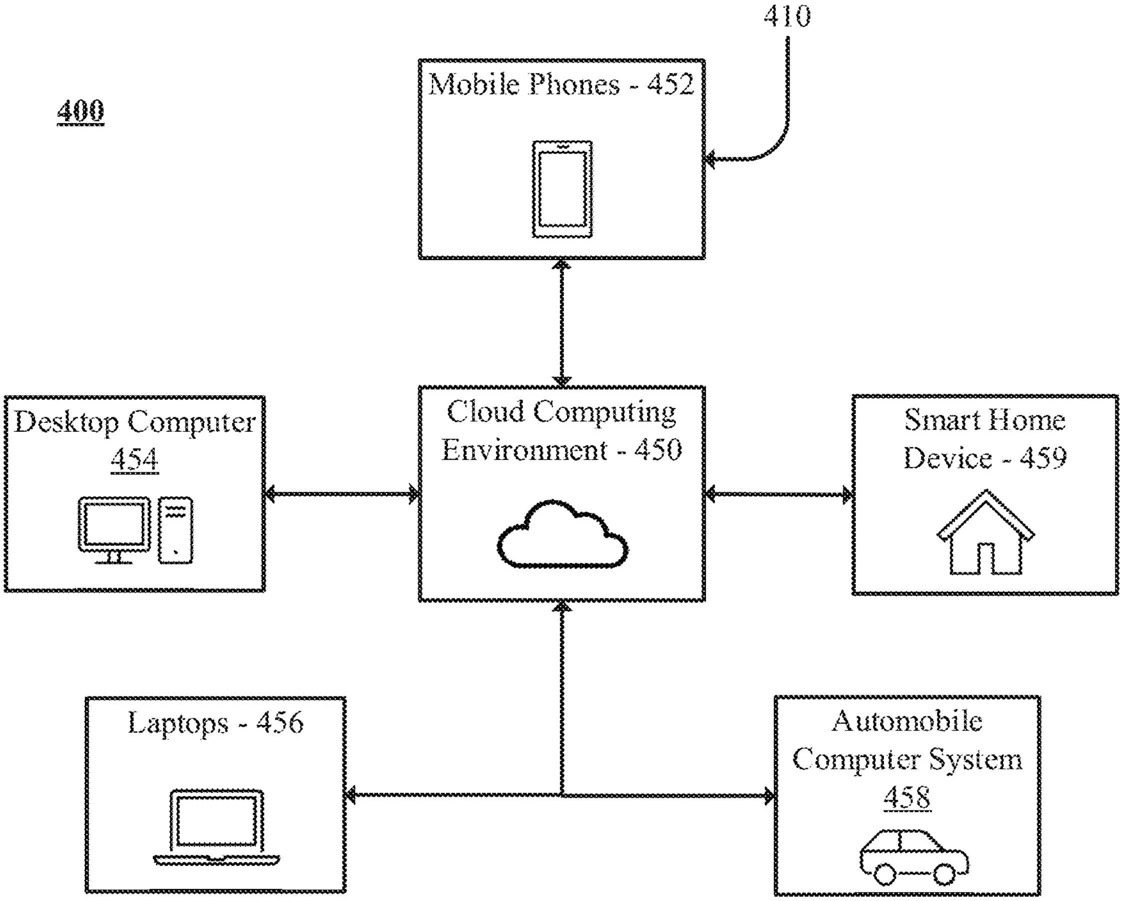
FIG. 4 is a block diagram illustrating a cloud system having cloud computing nodes that cloud consumers communicate with, in accordance with an embodiment of the present invention.

Referring now to FIG. 4, a block diagram illustrating a cloud system having cloud computing nodes that cloud consumers communicate with, in accordance with an embodiment of the present invention.

As shown, cloud system 400 can include a cloud computing environment 450 includes one or more cloud computing nodes 410 with which local computing devices used by cloud consumers, such as, for example, mobile phones 452, desktop computer 454, laptop computer 456, automobile computer system 458, and/or smart home device 459 may communicate. Computing nodes 410 may communicate with one another. They may be grouped (not shown) physically or virtually, in one or more networks, such as Private, Community, Public, or Hybrid clouds as described herein, or a combination thereof. This allows cloud computing environment 450 to offer infrastructure, platforms and/or software as services for which a cloud consumer does not need to maintain resources on a local computing device. It is understood that the types of computing devices 452, 454, 456, 458, 459 shown in FIG. 4 are intended to be illustrative only and that computing nodes 410 and cloud computing environment 450 can communicate with any type of computerized device over any type of network and/or network addressable connection (e.g., using a web browser).

In an embodiment, the CPD Module 350 of the intelligent system manager 340 can autonomously detect change points from the interactions between the computing nodes 410 and cloud system 301. Based on the detected change points, the system configuration of the cloud system 301 can be updated. For example, for processes concerning mobile phones 452, an anomalous (e.g., significantly increasing than normal) latency data 314 can be identified as a change point. A corresponding system maintenance plan 504 can be generated by the intelligent system manager 340 to resolve such change point such as increasing bandwidth capacity of the cloud system 301 for mobile phones 452.

Figure 5:
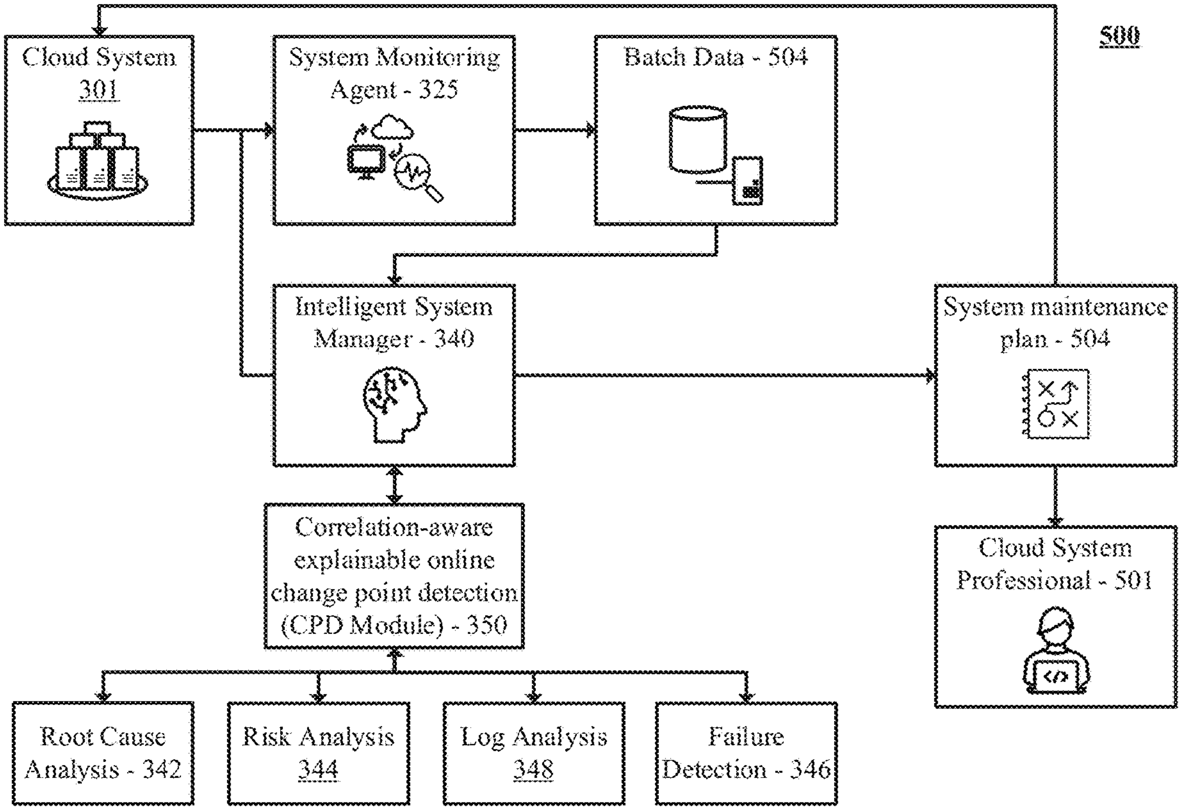
FIG. 5 is a block diagram illustrating a practical application of correlation-aware explainable online change point detection for artificial intelligence information technology operations of a cloud system, in accordance with an embodiment of the present invention.

Referring now to FIG. 5, a block diagram illustrating a practical application of correlation-aware explainable online change point detection for artificial intelligence operations of a cloud system, in accordance with an embodiment of the present invention.

In an embodiment, cloud system 500 can include an intelligent system manager 502 that can process the detected change points and can create a system maintenance plan 504 for the cloud system 301 to resolve a system issue caused by the detected change points. The system maintenance plan 504 can include applying system patches to the cloud system 301 to overcome a system vulnerability that can be caused by the detected change points. The intelligent system manager 502 can then provide recommendations to the cloud system professional 501 regarding the system maintenance plan 504 to assist with the decision-making of the cloud system professional 501. The recommendation can be adding computational resources to a computing node where the change point was detected. The recommendation can also be applying system patches to the cloud system 301. The recommendation can also be that the intelligent system manager 502 can autonomously place the cloud system 301 under system maintenance to install the system patches. The installation of the system patches can be done in the background and without interfering with accessing the cloud system 301.

In another embodiment, the intelligent system manager 502 can perform root cause analysis based on the detected change points. To perform root cause analysis, the detected change points can undergo incremental causal discovery and root cause localization as described herein. In another embodiment, the intelligent system manager 502 can output explanations regarding system faults or failure based on the detected change points as described herein. In another embodiment, the intelligent system manager 502 can perform log analysis and process the logs produced in the cloud system 301 and detect change points within the cloud system 301 through the logs. In another embodiment, the intelligent system manager 502 can perform risk analysis by analyzing the detected change points to identify the potential issues and consequences associated with the detected change points as described herein.

In another embodiment, the intelligent system manager 502 can generate recommendations for complying to environmental standards such as air quality and water quality based on the detected change points for a designated location. In another embodiment, the intelligent system manager 502 can recommend product replacement based on the detected change points of IoT devices. In another embodiment, the intelligent system manager can notify a decision-making person regarding change points detected from sensor networks for traffic data.

Other practical applications are contemplated.

Embodiments described herein may be entirely hardware, entirely software or including both hardware and software elements. In a preferred embodiment, the present invention is implemented in software, which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable storage medium such as a semiconductor or solid-state memory, magnetic tape, a removable computer diskette, a random-access memory (RAM), a read-only memory (ROM), a rigid magnetic disk and an optical disk, etc.

Each computer program may be tangibly stored in a machine-readable storage media or device (e.g., program memory or magnetic disk) readable by a general or special purpose programmable computer, for configuring and controlling operation of a computer when the storage media or device is read by the computer to perform the procedures described herein. The inventive system may also be considered to be embodied in a computer-readable storage medium, configured with a computer program, where the storage medium so configured causes a computer to operate in a specific and predefined manner to perform the functions described herein.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

As employed herein, the term "hardware processor subsystem" or "hardware processor" can refer to a processor, memory, software or combinations thereof that cooperate to perform one or more specific tasks. In useful embodiments, the hardware processor subsystem can include one or more data processing elements (e.g., logic circuits, processing circuits, instruction execution devices, etc.). The one or more data processing elements can be included in a central processing unit, a graphics processing unit, and/or a separate processor- or computing element-based controller (e.g., logic gates, etc.). The hardware processor subsystem can include one or more on-board memories (e.g., caches, dedicated memory arrays, read only memory, etc.). In some embodiments, the hardware processor subsystem can include one or more memories that can be on or off board or that can be dedicated for use by the hardware processor subsystem (e.g., ROM, RAM, basic input/output system (BIOS), etc.).

In some embodiments, the hardware processor subsystem can include and execute one or more software elements. The one or more software elements can include an operating system and/or one or more applications and/or specific code to achieve a specified result.

In other embodiments, the hardware processor subsystem can include dedicated, specialized circuitry that can perform one or more electronic processing functions to achieve a specified result. Such circuitry can include one or more application-specific integrated circuits (ASICs), field-programmable gate arrays (FPGAs), and/or programmable logic arrays (PLAs).

These and other variations of a hardware processor subsystem are also contemplated in accordance with embodiments of the present invention.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment. However, it is to be appreciated that features of one or more embodiments can be combined given the teachings of the present invention provided herein.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended for as many items listed.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the present invention and that those skilled in the art may implement various modifications without departing from the scope and spirit of the invention. Those skilled in the art could implement various other feature combinations without departing from the scope and spirit of the invention. Having thus described aspects of the invention, with the details and particularity required by the patent laws, what is claimed and desired protected by Letters Patent is set forth in the appended claims.

What is claimed is:

1. A computer-implemented method for correlation-aware explainable online change point detection, comprising:

transforming collected data metrics from a cloud system to correlation matrices;

capturing correlation shifts from the correlation matrices as differences of correlation between batches of collected data metrics through determined statistics of the batches of collected data metrics across timesteps including computing a geodesic distance between a Fréchet mean of the correlation matrices of past observations for a given time using a Riemannian metric and a correlation matrix for the given time;

detecting change points in the cloud system based on the correlation shifts to obtain detected change points, including:

determining a detection score from observations within a sliding window as the difference of the geodesic distance and a maximum of the geodesic distances for the past observations for the given time;

comparing the detection score to a threshold to determine whether the observation for the given time is a change point, and performing system maintenance autonomously based on the detected change points from identified system entities to optimize the cloud system with an updated configuration.

2. The computer-implemented method of claim 1, wherein performing system maintenance autonomously further comprises performing root cause analysis based on the detected change points.

3. The computer-implemented method of claim 1, wherein performing system maintenance autonomously further comprises further comprises generating explanations of the change points obtained from a status of the cloud system to assist a decision making of a cloud system professional.

4. The computer-implemented method of claim 1, wherein capturing correlation shifts from the correlation matrices further comprises computing a geodesic distance between a Fréchet mean of the correlation matrices of past observations for a given time using a log-Euclidean metric and a correlation matrix for the given time.

5. The computer-implemented method of claim 4, wherein detecting change points in the cloud system further comprises determining a detection score from observations within a sliding window as the difference of the geodesic distance and a maximum of the geodesic distances for the past observations for the given time.

6. The computer-implemented method of claim 1, wherein capturing correlation shifts from the correlation matrices further comprises computing a geodesic distance between a Fréchet mean of the correlation matrices of past observations for a given time using a log-Cholesky metric and a correlation matrix for the given time.

7. A system for correlation-aware explainable online change point detection, comprising;

a memory device; and one or more processor devices operatively coupled with the memory device to:

transform collected data metrics from a cloud system to correlation matrices;

capture correlation shifts from the correlation matrices as differences of correlation between batches of collected data metrics through determined statistics of the batches of collected data metrics across timesteps including computing a geodesic distance between a Fréchet mean of the correlation matrices of past observations for a given time using a Riemannian metric and a correlation matrix for the given time;

detect change points in the cloud system based on the correlation shifts to obtain detected change points, including:

determining a detection score from observations within a sliding window as the difference of the geodesic distance and a maximum of the geodesic distances for the past observations for the given time;

comparing the detection score to a threshold to determine whether the observation for the given time is a change point; and perform system maintenance autonomously based on the detected change points from identified system entities to optimize the cloud system with an updated configuration.

8. The system of claim 7, wherein one or more processor devices operatively coupled with the memory device to perform system maintenance autonomously further comprises performing root cause analysis based on the detected change points.

9. The system of claim 7, wherein one or more processor devices operatively coupled with the memory device to perform system maintenance autonomously further comprises further comprises generating explanations of the change points obtained from a status of the cloud system to assist a decision making of a cloud system professional.

10. The system of claim 7, wherein one or more processor devices operatively coupled with the memory device to capture correlation shifts from the correlation matrices further comprises computing a geodesic distance between a Fréchet mean of the correlation matrices of past observations for a given time using a log-Euclidean metric and a correlation matrix for the given time.

11. The system of claim 10, wherein one or more processor devices operatively coupled with the memory device to detect change points in the cloud system further comprises determining a detection score from observations within a sliding window as the difference of the geodesic distance and a maximum of the geodesic distances for the past observations for the given time.

12. The system of claim 7, wherein one or more processor devices operatively coupled with the memory device to capture correlation shifts from the correlation matrices further comprises computing a geodesic distance between a Fréchet mean of the correlation matrices of past observations for a given time using a log-Cholesky metric and a correlation matrix for the given time.

13. A non-transitory computer program product comprising a computer-readable storage medium including program code for correlation-aware explainable online change point detection, wherein the program code when executed on a computer causes the computer to:

transform collected data metrics from a cloud system to correlation matrices;

capture correlation shifts from the correlation matrices as differences of correlation between batches of collected data metrics through determined statistics of the batches of collected data metrics across timesteps including computing a geodesic distance between a Fréchet mean of the correlation matrices of past observations for a given time using a Riemannian metric and a correlation matrix for the given time;

detect change points in the cloud system based on the correlation shifts to obtain detected change points, including:

determining a detection score from observations within a sliding window as the difference of the geodesic distance and a maximum of the geodesic distances for the past observations for the given time:

comparing the detection score to a threshold to determine whether the observation for the given time is a change point; and perform system maintenance autonomously based on the detected change points from identified system entities to optimize the cloud system with an updated configuration through root cause analysis to generate explanations of the change points obtained from a status of the cloud system to assist a decision making of a cloud system professional.

* * * * *